Figure 1:
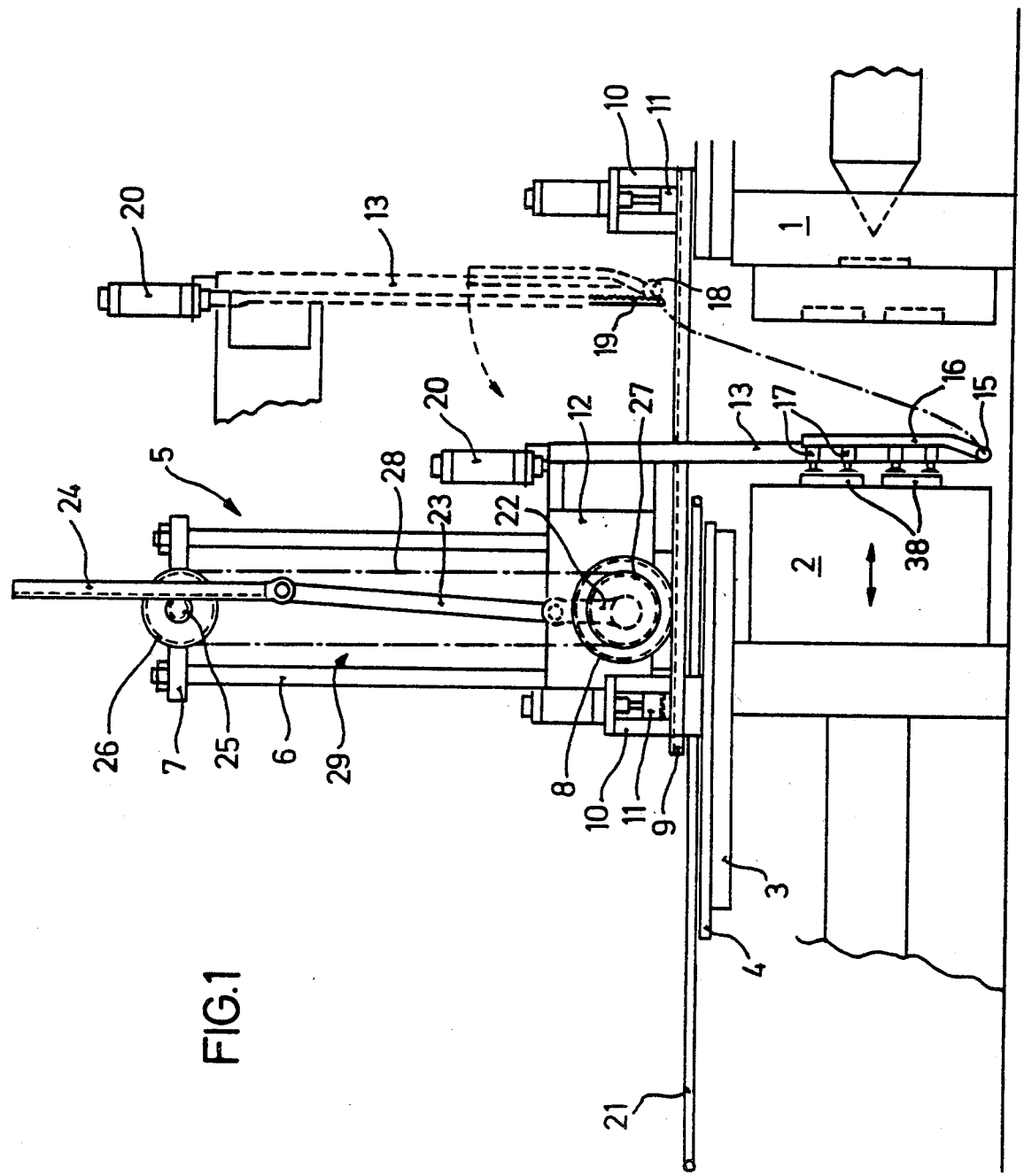

United States Patent [19]

Schmidts et al.

[11] 4,449,914
[45] May 22, 1984

[54] INJECTION MOLD WITH DEMOLDING DEVICE

[75] Inventors: Kurt Schmidts; Walter Schuett, both of Kehl, Fed. Rep. of Germany; Edmond Zeysolff, Meistratzheim, France; Wilhelm Saumer, Emmendingen, Fed. Rep. of Germany

[73] Assignee: BASF Aktiengesellschaft, Fed. Rep. of Germany

[21] Appl. No.: 452,423

[22] Filed: Dec. 23, 1982

[30] Foreign Application Priority Data

Jan. 7, 1982 [DE] Fed. Rep. of Germany ... 8200184[U]

[51] Int. Cl.³ .............................................. B29F 1/14
[52] U.S. Cl. .................................... 425/556; 425/444; 264/334
[58] Field of Search .................. 198/486; 212/128; 264/334; 414/564, 752; 425/436 R, 436 RM, 444, 556, 571, 546

[56] References Cited

U.S. PATENT DOCUMENTS 4,028,039 6/1977 DePutter .................... 425/436 R
4,204,824 5/1980 Paradis ....................... 425/436 R

FOREIGN PATENT DOCUMENTS 1381802 1/1975 United Kingdom .
1589079 5/1981 United Kingdom .

Primary Examiner—Thomas P. Pavelko
Assistant Examiner—V. Fischbach
Attorney, Agent, or Firm—Keil & Witherspoon

[57] ABSTRACT

An injection mold comprising a fixed and a movable mold half and a demolding device for the moldings, which essentially consists of grippers and a kinematic chain, by means of which the opening movement of the mold half is transferable to the holders of the grippers. By this means, the opening movement of the mold half can cause the grippers to move towards the moldings to be taken out of the mold half.

4 Claims, 3 Drawing Figures

INJECTION MOLD WITH DEMOLDING DEVICE

The present invention relates to an injection mold comprising a fixed and a movable mold half and a demolding device for the moldings which is connected to the movable mold half and which consists of one or more grippers guided in a pair of rails by means of a holder plate, a mounting plate for the pair of rails, a pinion which is rotatably held on the mounting plate and can roll on a rack which can, according to choice, be firmly connected to the fixed mold half or to the mounting plate, and a kinematic chain which converts the rotary movement of the pinion into a rectilinear movement of the holder plate for the grippers.

German Utility Model 7,904,564 describes an injection mold in which a gripper—coupled to the opening movement of the movable mold half—can be caused to move to a position above the moldings to be taken out of the mold half. To this effect, the gripper is driven by the movable mold half via a rack and pinion arrangement, of which the rack, which is mounted in a frame fixed to the mold half, runs on a rack which can be locked in position, and in doing so directly drives a further rack, connected to the gripper. Because of the rapid opening and closing movements of the movable mold half, high acceleration forces act on the gripper, and these can cause it to suffer rapid wear or even damage.

It is an object of the present invention to provide an injection mold with a demolding device, in which the transmission of movement from the movable mold half to the demolding device takes place gently.

We have found that this object is achieved by an injection mold of the type described at the outset, in which—in order to form the kinematic chain between the mold and the demolding device—the pinion is connected to a crank and the latter in turn is connected, via a hinged connecting rod, with an oscillating crank constructed as a rack for driving a further pinion, and the shaft of this pinion is coupled to a chain drive, to whose transport chain is fixed the holder plate for the grippers.

In an advantageous embodiment of the injection mold according to the invention, the grippers are mounted on a carrier arrangement which is itself pivotably mounted on a connecting element, fixed to the holder plate, to permit setting down the moldings on a conveyor belt allotted to the demolding device, the pivot axle of the arrangement being connected to a controllable drive.

In a preferred embodiment of the drive, the pivot axle of the carrier arrangement has a pinion which can be driven by a hydraulic or pneumatic working cylinder via a rack.

As a further development of the injection mold according to the invention, in order to ensure pivotability in two planes of the carrier arrangement for the grippers, the connecting element is held rotatable about its center axis in a sleeve by means of a coaxial trunnion, the sleeve is connected, via a shaft arranged at right angles and guided in a pipe, with a rotary drive, the pipe and rotary drive being fixed to the holder plate, and the trunnion of the connecting element has a bevel gear which, as the shaft rotates, can roll on a corresponding bevel gear fixed to the adjacent pipe end.

Further details and advantages of the injection mold according to the invention are to be found in the description, which now follows, of embodiments illustrated in the accompanying drawing.

In the drawing

Figure 2:
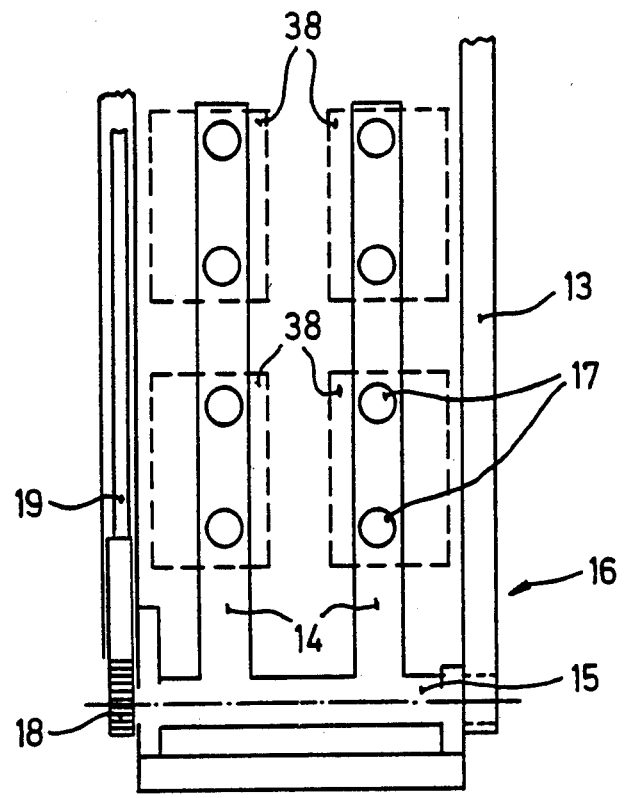
Figure 3:
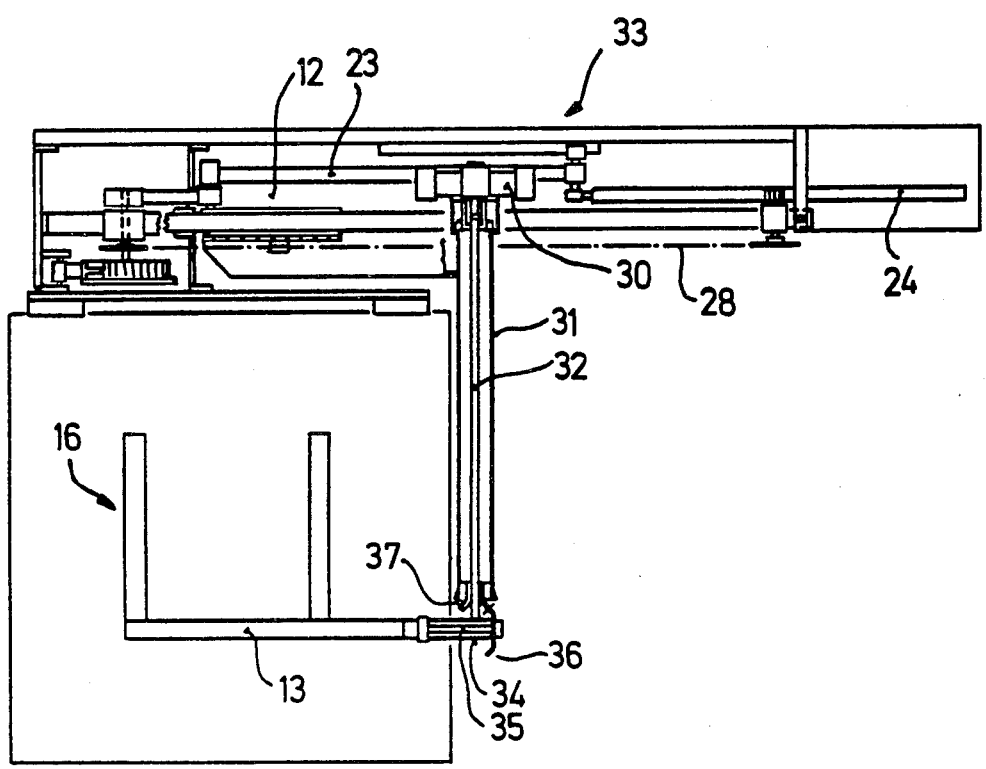

FIG. 1 shows the injection mold with the demolding device, in diagrammatic front view, FIG. 2 shows the carrier arrangement for the grippers, in plan view, and FIG. 3 shows the demolding device in a horizontal position, with a carrier arrangement pivotable in two planes, in side view.

The injection mold itself consists, in the conventional manner, of a fixed mold half 1 and a movable mold half 2, of which the fixed mold half is provided with feeds (not shown in the drawing) for the plastic melt (FIG. 1).

The movable mold half is equipped with horizontal slide rails 3, on which a mounting plate 4 for a device 5 for demolding the moldings 38 rests slidably and can be locked by means of bolts. The slidability permits optimum setting of the demolding device for the particular moldings to be demolded, and provides better accessibility during maintenance work. A pair of rails 6 is vertically fixed to the mounting plate, the rails being connected together by crossmembers 7. The lower crossmember, not visible in the drawing, accommodates a pinion 8 which can roll on a rack 9. By means of hydraulically or pneumatically operated clamping elements 10, for example toothed blocks 11, this rack can, according to choice, be connected firmly to the fixed mold half 1 or to the mounting plate 4.

It will be seen from the drawing that as the mold half 2 moves it takes the pair of rails 6 with it and at the same time the pinion 8 rolls on the rack 9, if the latter is fixed to the stationary mold half 1. The rotary movement of the pinion is transmitted, via a kinematic chain, to a holder plate 12, on which a carrier arrangement 16, formed by webs 14 extending from a rotary member 15, is fixed via a connecting element 13 (FIG. 2). This carrier arrangement accommodates grippers 17, such as tongs or suction pads or clamping mechanisms. It is advantageous if the carrier arrangement is held pivotably on the connecting element and is driven by a hydraulic or pneumatic working cylinder 20 via a pinion 18 fixed to the pivot axle and a rack 19 meshing with this pinion. This makes it possible to set down the moldings, demolded from the mold half 2, on a conveyor belt 21 allotted to the demolding device.

The kinematic chain between the pinion 8 and the grippers 17 constitutes a positive coupling between the opening movement of the mold half 2 and the movement of the grippers towards the moldings. It consists of a crank 22, connectd to the pinion so as to rotate with it, and acting, via a hinged connecting rod 23, on an oscillating crank 24 constructed as a rack. This meshes with a pinion 25 mounted in the upper crossmember 7, a sprocket 26 being fixed to the shaft of the pinion. A transport chain 28 is passed around this sprocket and a further sprocket 27 mounted in the lower crossmember, the holder plate 12 for the grippers 17 being anchored to the chain 28, specifically—in accordance with the required sequence of movements—to the left-hand portion 29 of the chain.

The crank mechanism creates a sinusoidal sequence of movements of the demolding device, thereby ensuring balanced acceleration and deceleration of the device.

In a more elaborate embodiment of the injection mold described above, the carrier arrangement 16 of the grippers 17 is constructed to give pivotability in two planes (FIG. 3). This is intended to provide free selectability of the setting-down position for the demolded moldings, and to allow maximum swinging clear from the machine bed of the injection-molding machine. For this purpose, the holder plate 12 is equiped with a hydraulic or pneumatic rotary drive 30, followed by a static pipe 31, in which is guided a shaft 32 of the rotary drive; the kinematic chain 33 is here arranged horizontally. At the free end of the shaft, a sleeve 34 is provided at right angles, the connecting element 13 for the carrier arrangement 16 being rotatably held in this sleeve by means of a coaxial trunnion 35. At its end projecting beyond the sleeve 34 the trunnion has a bevel gear 36, which can roll on a corresponding bevel gear fixed to the adjacent end of the pipe 31. As the drive 30 turns the shaft 32 and thereby pivots the carrier arrangement 16, via the sleeve 34 attached thereto, in one plane, the bevel gear 36 of the trunnion 35 is forced to roll over the fixed bevel gear 37 and in doing so pivots the carrier arrangement in a second plane, about the center axis of the connecting element 13. This makes it possible to achieve a setting-down position for the moldings which is outside the immediate vicinity of the machine.

We claim:

1. An injection mold comprising a fixed and a movable mold half and a demolding device for the moldings which is connected to the movable mold half and which consists of one or more grippers guided in a pair of rails by means of a holder plate, a mounting plate for the pair of rails, a pinion which is rotatably held on the mounting plate and can roll on a rack which can be firmly connected to the fixed mold half or to the mounting plate, and a kinematic chain which converts the rotary movement of the pinion into a rectilinear movement of the holder plate for the grippers, wherein, in order to form the kinematic chain, the pinion is connected to a crank and the latter in turn is connected, via a hinged connecting rod, with an oscillating crank constructed as a rack for driving a further pinion, and the shaft of this pinion is coupled to a chain drive, to whose transport chain is fixed the holder plate for the grippers.

2. An injection mold as claimed in claim 1, wherein the grippers are mounted on a carrier arrangement which is itself pivotably mounted on a connecting element, fixed to the holder plate, to permit setting down the moldings on a conveyor belt allotted to the demolding device, the pivot axle of the arrangement being connected to a controllable drive.

3. An injection mold as claimed in claim 2, wherein the pivot axle of the carrier arrangement has a pinion which can be driven by a hydraulic or pneumatic working cylinder via a rack.

4. An injection mold as claimed in claim 2, wherein, in order to ensure pivotability in two planes of the carrier arrangement for the grippers, the connecting element is held rotatable about its center axis in a sleeve by means of a coaxial trunnion, the sleeve is connected, via a shaft arranged at right angles and guided in a pipe, with a rotary drive, the pipe and rotary drive being fixed to the holder plate, and the trunnion of the connecting element has a bevel gear which, as the shaft rotates, can roll on a corresponding bevel gear fixed to the adjacent pipe end.

* * * * *